US007789760B2

(12) United States Patent
Roireau

(10) Patent No.: US 7,789,760 B2
(45) Date of Patent: Sep. 7, 2010

(54) GAMING MACHINE AND A METHOD OF LIGHTING THE SAME

(75) Inventor: Alan R Roireau, Aroda, VA (US)

(73) Assignee: Video Gaming Technologies, Roebuck, SC (US)

( * ) Notice: Subject to any disclaimer, the term of this patent is extended or adjusted under 35 U.S.C. 154(b) by 1352 days.

(21) Appl. No.: 11/258,564

(22) Filed: Oct. 25, 2005

(65) Prior Publication Data

US 2006/0094511 A1 May 4, 2006

Related U.S. Application Data

(60) Provisional application No. 60/623,045, filed on Oct. 28, 2004.

(51) Int. Cl.
*A63F 13/00* (2006.01)

(52) U.S. Cl. .......................................... 463/46; 463/20

(58) Field of Classification Search .................. 463/46, 463/20; D21/325, 326, 327, 329, 331, 333, D21/369, 370
See application file for complete search history.

(56) References Cited

U.S. PATENT DOCUMENTS 6,027,115 A 2/2000 Griswold et al.
6,705,611 B2 * 3/2004 Kato ...................... 273/143 R
6,722,979 B2 * 4/2004 Gilmore et al. ............... 463/20
2002/0173354 A1 11/2002 Winans et al.
2003/0130042 A1 7/2003 Ollins
2003/0195045 A1 10/2003 Kaminkow et al.
2004/0132522 A1 7/2004 Seelig et al.
2004/0166917 A1 * 8/2004 Lam et al. ..................... 463/16
2004/0166927 A1 8/2004 Okada

* cited by examiner

*Primary Examiner*—Dmitry Suhol
*Assistant Examiner*—Thomas H Henry
(74) *Attorney, Agent, or Firm*—Howard & Howard Attorneys PLLC

(57) ABSTRACT

A gaming machine includes a cabinet having a glass panel, a player interaction device disposed in the cabinet for determining a winning outcome of the game, and a light emitting device, such as, EL wire, sheet, and the like, extends about the periphery of the glass panel and/or behind the glass panel. A plurality of reels are disposed inside the cabinet and are rotatable about an axis with each reel having an outer surface and a reel strip mounted thereto and a plurality of symbols defined on the reel strip and exposed to the glass panel. At least one pay line is spaced from each of the reels. The pay line is illuminated independent from and in alternating mode with the symbols in response to the winning outcome of the game.

13 Claims, 3 Drawing Sheets

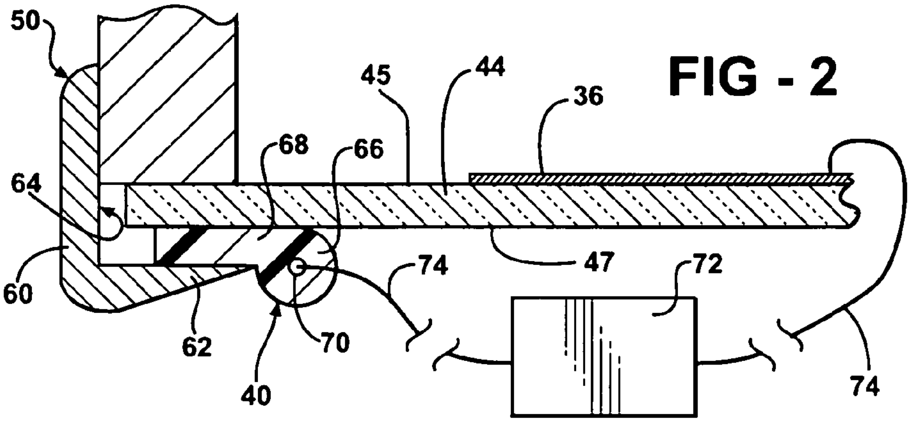
FIG - 2
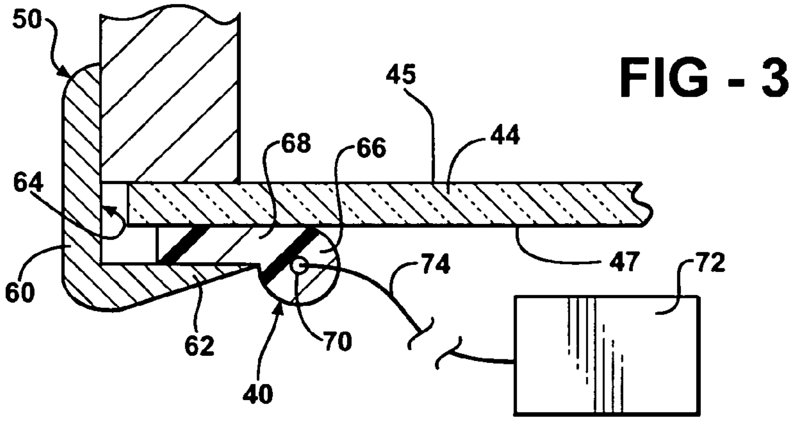
FIG - 3
FIG - 4
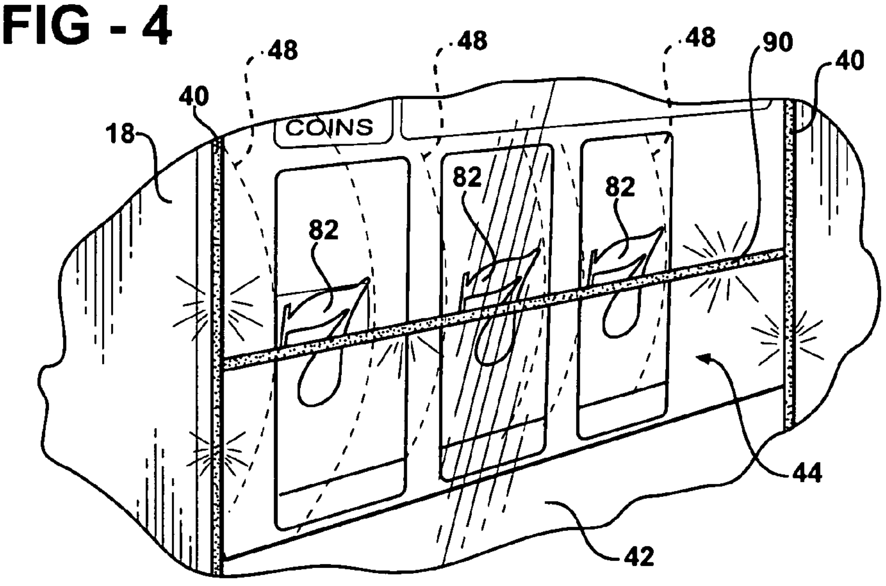

GAMING MACHINE AND A METHOD OF LIGHTING THE SAME

CROSS REFERENCE TO RELATED APPLICATION

This application claims the benefit of application Ser. No. 60/623,045 filed on Oct. 28, 2004, which is hereby incorporated by reference.

FIELD OF THE INVENTION

The subject invention relates to gaming machines, and more particularly to a configuration of a gaming machine having illumination components disposed therein.

BACKGROUND OF THE INVENTION

The goal of the gaming industry is to increase interest of players and excitement of each game to keep the players playing longer, thereby generating more revenue for game operators, such as casinos. For this purpose, many gaming machines utilize light to enhance their displays and to attract the attention of the players. Many different kinds of illuminating devices have been developed for the gaming machines to further attract the player's interest.

The modern gaming industry is replete with different gaming machines, which allows players an opportunity to win money by placing a certain amount of money at risk. Typically, manufactures of the aforementioned gaming machines desire these machines to be attractive, amusing, and comfortable for the players. Various configurations of the gaming machines are currently known in the gaming industry and taught by U.S. Pat. No. 6,027,115 to Griswold et al.; and United States Patent Application Publication Nos. 2002/0173354 to Winans et al.; 2003/0130042 to Ollins; 2003/0195045 to Kaminkow et al.; 2004/0132522 to Seelig et al.; and 2004/0166927 to Okada.

The United States Patent Application Publication No. 2003/0195045 to Kaminkow et al., for example, teaches a gaming machine having a housing, which carries a screen. Internal activating lights, such as ultraviolet lights are disposed inside the housing to emit ultraviolet radiation. The ultraviolet lights of the gaming machine taught by the United States Patent Application Publication No. 2003/0195045 to Kaminkow et al. are not visible from the distance in order to attract attention of the player by distinguishing the game machine from other game machines located in the same area or the same row.

The United States Patent Application Publication No. 2004/0166927 to Okada, on the other hand, teaches a gaming machine having a cabinet defining an upper panel and a lower panel and a display device disposed therebetween. The display device includes a liquid crystal display device and backlights for backlighting the liquid crystal display device. The backlights are controlled so as to light when electric power is supplied and to help a player to identify the images displayed on the liquid crystal display device visually and clearly. A pair of illuminating lamps are attached to the upper decoration panel and the lower decoration panel. The illuminating lamps illuminate the symbols drawn on multiple reels both directly and indirectly via reflection plates connected to the decoration panel and the lower decoration panel. Similar to the United States Patent Application Publication No. 2003/0195045 to Kaminkow et al., the liquid crystal backlights and the illuminating lamps are not visible from the distance to attract attention of the player by distinguishing the game machine from other game machines located in the same area or the same row.

One of the problems not addressed by the aforementioned prior art references, is a long felt need that exists for an efficient and effective lighting system for reel-type gaming devices and cabinets of this gaming devices to attract attention of the players.

Accordingly, it is desirable to increase the entertainment and the excitement of the playing of the gaming machines by adding a large variety of attractions and attention getting devices to the respective machines.

The present invention is aimed at one or more of the problems addressed above.

SUMMARY OF THE INVENTION AND ADVANTAGES

In one aspect of the present invention a cabinet for a gaming machine having a player interaction device allowing a player to make a wager on an outcome of the game, includes a housing and a glass panel disposed in the housing. A chrome bracket is connected to the front of the housing and extends peripherally about the glass panel. The light emitting device is sandwiched between and extends along the periphery of the chrome bracket and the glass panel for illuminating the exterior of the glass panel and providing a fluid resistant environment inside the housing. A light emitting device is defined by an electroluminescent wire (the EL) having a circular head and a tail portion extending from the circular head and a core member disposed in and extending through the circular head.

In another aspect of the present invention a gaming machine includes a cabinet defined by a back wall and a front wall defining a display panel or glass and a side wall interconnecting the front wall and the back wall. A chrome bracket is connected to the front wall and extends peripherally about the glass. The light emitting device is sandwiched between and extends along the periphery of the chrome bracket and the glass for illuminating the exterior of the glass and providing a fluid resistant environment inside the cabinet. A light emitting device is defined by an electroluminescent wire (the EL) having a circular head and a tail portion extending from the circular head and a core member disposed in and extending through the circular head.

In still another aspect of the present invention a cabinet for a gaming machine includes a player interaction device for allowing a player to make a wager on an outcome of the game. A controller having a circuit is disposed in the cabinet. The cabinet includes a glass panel disposed therein. A plurality of reels are disposed inside the cabinet. The reels are rotatable about an axis. Each of the reels has an inner surface and an outer surface. A reel strip is mounted to the outer surface and includes a plurality of symbols exposed to the glass panel. At least one light element is disposed behind the reel strip for illuminating the symbols. A pay line, defined by an electroluminescent member, is spaced from and extends along each of the reels. The pay line is connected to the circuit of the controller. The pay line and the symbols on the reels are illuminated in unison in response to the winning outcome of the game. Alternatively, the pay line and the symbols on the reels are illuminated independent from and alternate back and forth between one and the other in response to the winning outcome of the game.

Accordingly, an advantage of the present invention is to provide a gaming machine that increases the entertainment and the excitement of the game, as the game is played, by adding a large variety of attractions and attention getting devices, such as the EL incorporated in the gaming machine for emitting a sudden glow of fluorescence or iridescence to attract attention of the players and to increase a visual appeal of the gaming machine in response to the winning outcome of the game by illuminating the reels, the cabinet, and other components of the gaming machine.

Another advantage of the present invention is to provide a gaming machine with an improved energy-saving alternative as compared to the conventional hot bulbs.

Still another advantage of the present invention is to provide an a gaming cabinet with an improved design wherein the use of the EL improves functionality of the gaming machine by providing a "rubberized", i.e. resilient cushion between the glass and the chrome brackets which holds the glass in place more securely and adds to the water resistant qualities of the gaming machine.

Still another advantage of the present invention is to provide the EL around the periphery of the gaming machine for illuminating the same and for saving space inside the gaming machine for additional operational components as compared to the conventional large fluorescent-bulb used in the prior art.

Still another advantage of the present invention is to provide the EL and other electroluminescent devices on the interior and the exterior of the gaming machine and the glass panels of the gaming machine to evenly illuminate the same thereby reducing potential "hot spots"

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a cross sectional view of a glass panel disposed in a housing of the gaming machine with the glass panel engaged by a bracket and an electroluminescent wire sandwiched between the exterior of the glass panel and the bracket for illuminating the gaming machine from the exterior of the gaming machine and an electroluminescent sheet disposed on the interior of the glass panel for illuminating the gaming machine from the interior and for providing a backlight;

FIG. 3 is another cross sectional view of the glass panel, as shown in FIG. 2, disposed in the housing of the gaming machine without the electroluminescent sheet disposed on the interior of the glass panel for illuminating the gaming machine and providing the backlight;

FIG. 4 is a perspective and partially cross sectional view of a pay line and reels of the gaming machine illuminated relative to one another in alternating mode.

DETAILED DESCRIPTION OF THE INVENTION

Figure 1:
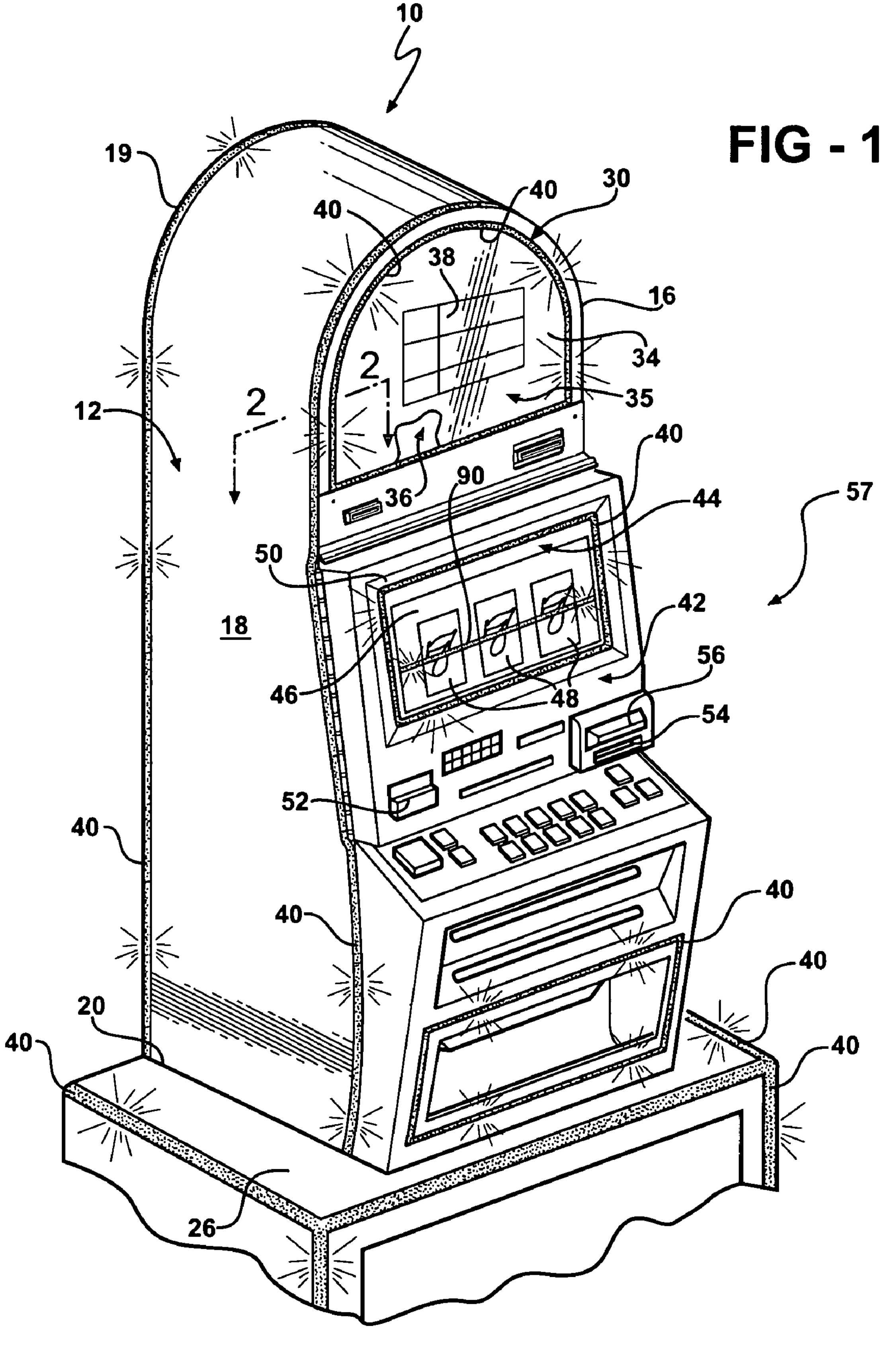
FIG. 1 is a perspective view of an inventive gaming machine.

Referring to FIGS. 1 through 3, an electronic gaming machine of the present invention, generally shown at 10. The gaming machine 10 is adaptable for playing a game and processing a currency, such as money, tokens, tickets, and the like. The gaming machine 10 has a cabinet or a housing, generally indicated at 12, that includes a pair of side walls or side panels 16, 18, a back panel 19, a bottom panel 20, defining an interior surface 24. The side panels 16, 18, the back panel 19, the bottom panel 20 are exposed to an open front. A support base 26 is positioned below the housing 12 to support the housing 12.

The housing 12 is separated into at least three sections. A top portion or crown, generally indicated at 30, is connected to the side walls 16, 18, as known to those skilled in the art. Alternatively, the top portion 30 is pivoted away from the housing 12 vertically relative to the side walls 16, 18 between an opened position, as the top portion 30 disengages from the side walls 16, 18, and a closed position, as the top portion 30 is oriented substantially co-planar with the side walls 16, 18. The top portion 30 presents a display panel or glass 34, adaptable for conveying information to the player. In one aspect of the present invention, a first electroluminescent sheet, generally indicated at 36, is attached to the internal side of the glass 34. In another aspect of the present invention, the top portion 30 includes a second electroluminescent sheet, generally indicated at 35 and connected to the outer side of the glass 34. In a third aspect of the present invention both electroluminescent sheets 35 and 36 are connected to the outer side and the internal side of the glass 34. Both electroluminescent sheets 35 and 36 may be pre-cut to match the shape of a pseudo-paytable 38 and is adhered to the glass 34 to backlight the pseudo-paytable 38 by adhesive or the like. In one aspect of the present invention the electroluminescent sheets 36 may extend along the entire periphery of the glass 34. In another aspect of the present invention the electroluminescent sheets 36 may partially cover the glass 34. The electroluminescent sheet 38 like other electrominescent devices such as wires, stripes, and other shapes is an optical phenomenon and electrical phenomenon wherein the material emits light in response to an electric current passed through it, or to a strong electric field.

The bright light of the electroluminescent devices, such as av electroluminescent sheet (the EL sheet) 38 or an electroluminescent wire (the EL) 40, as discussed in great details further below, attracts attention of the players is the result of radiative recombination of electrons and holes in a material (usually a semiconductor). The excited electrons release their energy as photons—light. Prior to recombination, electrons and holes are separated either as a result of doping of the material to form a p-n junction, or through excitation by impact of high-energy electrons accelerated by a strong electric field (as with the phosphors in electroluminescent displays). The use of the EL sheet 38, the EL 40, or other electroluninescent devices, such as the EL tape (not shown), the EL sheet 38 (not shown), and the like, attached to the exterior of the gaming cabinet 12, such as for example, between the back panel 19 and the side walls 16 and 18 and about the support base 26, as illustrated in FIG. 1, serves several functions. First, it calls attention to the gaming cabinet 12, improves the visibility of the gaming machine 10 and highlight additional information displayed by the top portion 34 such as, for example, the title of the gaming machine 10, the minimum cost to operate the gaming machine 10, the potential prize or winnings that could be won by playing the gaming machine 10, or the like.

Referring back to FIGS. 1 through 3, a display portion or door, generally indicated at 42, is positioned below the top portion 30. The display portion 42 is movable between an opened position, as the display portion 42 disengages one of the side walls 16, and a close position, as the display portion 42 is oriented substantially co-planar with the side walls 16, 18. A display device or glass panel, generally indicated at 44, is disposed in the display portion 42 and includes an inner side 45 and an outer side 47. The glass panel 44 is spaced from a display screen 46 that can display text, graphics or a combination thereof. In one aspect of the present invention and similar to the top portion 30, the glass panel 44 includes the first electroluminescent sheet 36 connected to the internal side 45, as shown in FIG. 2. In another aspect of the present invention, the second electroluminescent sheet (not shown) is attached to the outer side 47 of the glass panel 44 (not shown). In a third aspect of the present invention (not shown) both electroluminescent sheets may be attached to the inner 45 and outer 47 sides of the glass panel 44. Both electroluminescent sheets are adhered to the glass panel 44 by adhesive or the like to backlight the same to attract attention of the players. In one aspect of the present invention the electroluminescent sheets 36 may extend along the entire periphery of the glass panel 44. In another aspect of the present invention the electroluminescent sheets 36 may partially cover the glass panel 44. The display screen 46 includes a plurality of openings for exposing reels 48 therethrough to be viewed by the player. The reels 48 will be discussed as the description of this invention proceeds. The glass panel 44 may include a circular configuration or rectangular configuration. A bracket 50 formed from a chrome or other material, is connected to and extends peripherally about the glass panel 44. Alternatively the bracket 50 may be formed in a shape of a cover encapsulating the entire display portion 42 with at least two openings with the glass panel 44 extending to one of the openings. The bracket 50 includes and is not limited to a coin acceptor 52, a credit card receiver 54, a ticket injector and receiver 56, and the like, which in combination with the plurality of reels 48 present a player interaction device or system, generally shown at 57 in FIG. 1, to allow the player to make a wager on an outcome of the game played.

As best shown in FIGS. 2 and 3, the bracket 50 is further defined by lip portions 60 extending to an edge 62 and defining an inner surface, generally indicated at 64. The inner surface 64 has an L-shaped contour as viewed in a cross section. The EL 40 is sandwiched between and extends along the periphery of the bracket 50, as illustrated in FIG. 1, and the glass panel 44 for illuminating the glass panel 44 from the exterior of the gaming machine 10. In the illustrative embodiment of the present invention, the EL 40 has a circular head 66 and a tail portion 68 extending from the circular head 66. Those skilled in the art will appreciate that the head 66 may include any other non-configuration, such as, for example, a rectangular configuration (not shown). The circular head 66 is not intended to limit the present invention. A core member 70 is disposed in and extends through the circular head 66. A source of a power supply 72 is connected to the core member 70 and to the EL sheet 36 by wires 74 connected to an adapter, such as, for example, a Molex adapter (not shown), for passing an electric current therethrough for emitting light in response to the electrical current. Alternatively, a switch (not shown) is disposed inside the gaming cabinet 12 to allow the EL 40 to be operated independently of other light emitting devices (not shown). The tail portion 68 is abuttingly disposed in the inner surface 64 with the circular head 66 extending beyond the edge 62. The EL 40 sandwiched between the glass panel 44 and the bracket 50 provides a fluid resistant environment inside the gaming housing 12 and forming a rubberized cushion between the glass panel 44 and the bracket 50 which holds the glass panel 44 in place in a more secure fashion and improves water resistant qualities of the gaming cabinet 12. The EL 40 may be disposed inside a polycarbonate transparent tubing (not shown) to keep the EL 40 secured and planar relative the bracket 50. At the joints in the tubing, a plastic wire clamp (not shown) is attached to the gaming cabinet 12 by drilling a hole hidden in the gaming cabinet 12 and pop-riveting the clamps to the gaming cabinet 12. Various other methods of attaching the EL 40 are used to connect the EL 40 to the gaming cabinet 12. These methods include adhesives, fasteners, clamps, and other mechanical devices and are not intended to limit the present invention.

Figure 5:
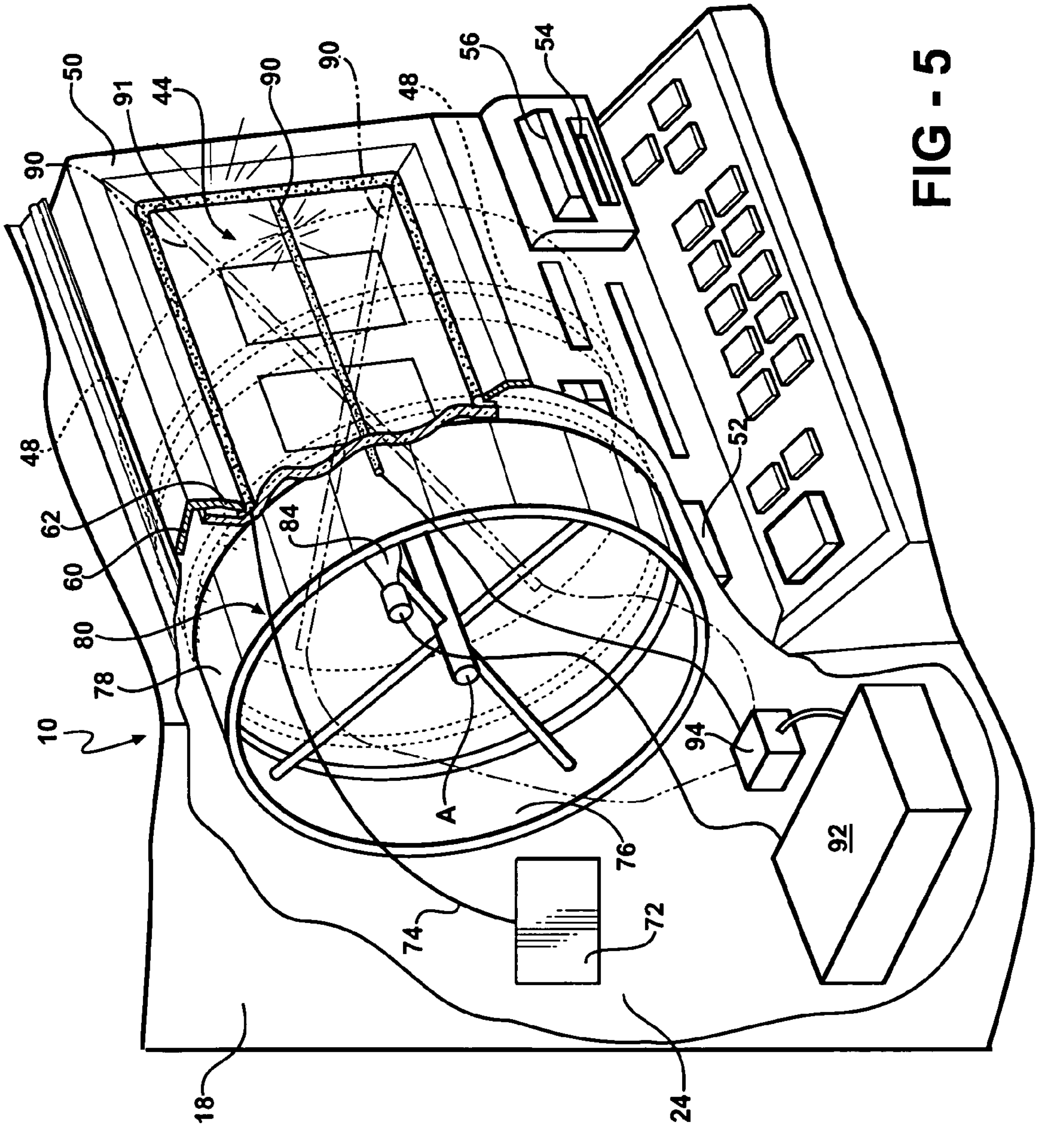
FIG. 5 is a perspective and partially cross sectional view of the reels and the pay line of the gaming machine operably connected to a controller and a converter disposed in the gaming machine.

Alluding to the above, the reels 48 are disposed inside the gaming cabinet 12 and are rotatable about an axis A, as best shown in FIG. 5. Each of the reels 48 presents an inner surface 76 and an outer surface 78 having a reel strip, generally indicated at 80, mounted to the outer surface 78. The reel strip 80 has a plurality of symbols 82 exposed to the player and at least one lighting element 84 disposed behind the reel strip 80 for illuminating the symbols 82. Alternatively, the reel strip 80 is formed from the electroluminescent material that emits light in response to the electric current passed through it thereby attracting the attention of the players.

As best shown in FIG. 5, a plurality of pay lines 90 is spaced from and extends along each of the reels 48. The pay lines 90 are connected to a controller or a game computer 92 having a central processing unit (not shown). The game computer 92 is positioned within the housing 12 and is communicated with the plurality of reels 48 and the pay lines 90 for spinning the plurality of reels 48 and determining the outcome of the game. The game computer 92 performs multiple player interaction functions, as known to those skilled in the computer art, which are necessary for the gaming application. The game computer 92 also controls the text or graphics displayed on the display device 42. The pay line 90 is defined by a light emitting device, such as for example an electroluminescent wire 91. Those skilled in the art will appreciate that other light emitting devices, such as, for example, an electroluminescent sheet, an electroluminescent strip, one or more light emitting diodes, a fluorescent light bulb, an incandescent light bulb, and any other suitable light or lighting devices may be used as the pay line 90 and are not intended to limit the present inventive concept. Each pay line 90 is positioned between the glass panel 44 and the reels 48. Each pay line 90 is attached to the glass panel 44. To increase illumination effect and add to the excitement of the game being played, at least one pay line 90 may extend between the glass panel 44 and the reels 48. A circuit board 94 interconnects each pay line 90 and is disposed between the game computer 92 and each of the pay lines 90. The circuit board 94 controls operation of the pay lines 90 to illuminate the pay lines 90 independent from the symbols 82 and in alternating mode in response to the winning outcome of the game. Alternatively, the pay lines 90 and the symbols 82 on the reels 48 are illuminated in unison in response to the winning outcome of the game.

Alluding to the above, the gaming machine 10 of the present invention provides numerous advantages over prior art gaming machines currently used in a casino environment. One of the advantages is the unique view of the gaming cabinet 12 that increases the entertainment and excitement of the playing of the game by adding a large variety of attractions and attention getting devices incorporated in the gaming cabinet 12 for emitting a sudden glow of fluorescence or iridescence to attract attention of the players. In particular the EL 40 extending about the exterior of the gaming cabinet 12 make the gaming cabinet 12 more attractive and noticeable to the players.

The unique design of the present invention provides illumination across the entire surface of the glass panel 44, which allows to illuminate the glass panel 44 around the different internal components of the gaming machine such as the aforementioned reels 48 and/or multiple video screens (not shown), thereby eliminating shadows. Another advantage of the gaming machine 10 relates to an improved design wherein the use of the EL 40 improves functionality of the gaming machine 10 by providing a rubberized cushion between the glass panel 44 and the chrome bracket 50 not shown or used in the prior art.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment, but that the invention will include all embodiments falling within the scope of the appended claims.

What is claimed is:

1. A gaming machine comprising:

a housing defined by a back wall and a front wall defining at least one transparent panel having an inner side and an outer side and spaced side walls interconnecting said front wall and said back wall;

a bracket connected to said front wall and extending peripherally about said transparent panel with said bracket extending to an edge and presenting an inner surface;

a light emitting device sandwiched between and extending along the periphery of said bracket and said outer side of said transparent panel for illuminating said transparent panel externally and for providing a fluid resistant environment inside said housing;

said light emitting device defined by an electroluminescent wire having a circular head and a tail portion extending from said circular head and a core member disposed in and extending through said circular head portion with said tail portion being disposed in said inner surface with said circular head extending beyond said edge of said frame;

a first electroluminescent sheet connected to said outer side of said transparent panel;

a second electroluminescent sheet connected to said inner side of said transparent panel;

a power supply connected to said core member for passing an electric current therethrough for emitting light in response to the electrical current;

a plurality of reels disposed inside said housing and rotatable about an axis with each of said reels having an inner surface and an outer surface having a reel strip mounted to said outer surface with said reel strip having a plurality of symbols exposed to a player and at least one light element disposed behind said reel strip for illuminating said symbols;

a controller disposed in said housing and adaptable for determining an outcome of the game;

at least one pay line defined by an electroluminescent member being spaced from and extending along each of said reels with said at least one pay line connected to said controller; and a circuit board connected to said controller for illuminating said electroluminescent member in response to a winning outcome of the game.

2. A gaming machine, as set forth in claim 1, wherein said bracket is further defined by a frame extending to an edge and defining an inner surface having a L-shaped contour.

3. A gaming machine, as set forth in claim 2, wherein said tail portion is abuttingly disposed in said inner surface with said circular head extending beyond said edge of said frame.

4. A gaming machine, as set forth in claim 1, wherein said electroluminescent member is further defined by a wire.

5. A gaming machine, as set forth in claim 1, wherein said electroluminescent member is further defined by a sheet.

6. A gaming machine, as set forth in claim 1, wherein said electroluminescent member is further defined by a tape.

7. A gaming machine as set forth in claim 1 wherein a circuit board connected to said controller to illuminate said electroluminescent member independent from said symbols and to alternate illumination of said electroluminescent member and said symbols in response to a winning outcome of the game.

8. A gaming machine comprising:

a housing defined by a back wall and a front wall defining at least one transparent panel having an inner side and an outer side and spaced side walls interconnecting said front wall and said back wall;

a bracket connected to said front wall and extending peripherally about said transparent panel with said bracket extending to an edge and presenting an inner surface;

a light emitting device sandwiched between and extending along the periphery of said bracket and said outer side of said transparent panel for illuminating said transparent panel externally and for providing a fluid resistant environment inside said housing;

said light emitting device defined by an electroluminescent wire having a circular head and a tail portion extending from said circular head and a core member disposed in and extending through said circular head portion with said tail portion being disposed in said inner surface with said circular head extending beyond said edge of said frame;

a first electroluminescent sheet connected to said outer side of said transparent panel;

a second electroluminescent sheet connected to said inner side of said transparent panel;

a power supply connected to said core member for passing an electric current therethrough for emitting light in response to the electrical current;

a plurality of reels disposed inside said housing and rotatable about an axis with each of said reels having an inner surface and an outer surface having a reel strip mounted to said outer surface with said reel strip having a plurality of symbols exposed to a player and at least one light element disposed behind said reel strip for illuminating said symbols;

a controller disposed in said housing and adaptable for determining an outcome of the game;

at least one pay line defined by an electroluminescent member being spaced from and extending along each of said reels with said at least one pay line connected to said controller; and a circuit board connected to said controller for illuminating said electroluminescent member and for alternating illumination of said electroluminescent member and said symbols in response to a winning outcome of the game.

9. A gaming machine, as set forth in claim 8, wherein said bracket is further defined by a frame extending to an edge and defining an inner surface having a L-shaped contour as viewed in a cross section.

10. A gaming machine, as set forth in claim 9, wherein said display panel is formed from glass.

11. A gaming machine, as set forth in claim 8, wherein said electroluminescent member is further defined by a wire.

12. A gaming machine, as set forth in claim 8, wherein said electroluminescent member is further defined by a sheet.

13. A gaming machine, as set forth in claim 8, wherein said electroluminescent member is further defined by a tape.

* * * * *